US011729385B2

(12) United States Patent
Zhu et al.

(10) Patent No.: US 11,729,385 B2
(45) Date of Patent: Aug. 15, 2023

(54) SYSTEMS AND METHODS FOR PARTITIONING VIDEO BLOCKS FOR VIDEO CODING

(71) Applicant: Sharp Kabushiki Kaisha, Sakai (JP)

(72) Inventors: Weijia Zhu, Vancouver, WA (US); Christopher Andrew Segall, Vancouver, WA (US); Kiran Mukesh Misra, Vancouver, WA (US); Jie Zhao, Vancouver, WA (US); Michael Horowitz, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/584,497

(22) Filed: Jan. 26, 2022

(65) Prior Publication Data

US 2022/0150494 A1 May 12, 2022

Related U.S. Application Data

(63) Continuation of application No. 16/957,419, filed as application No. PCT/JP2018/047957 on Dec. 26, 2018, now Pat. No. 11,277,609.

(60) Provisional application No. 62/612,180, filed on Dec. 29, 2017.

(51) Int. Cl.
*H04N 19/119* (2014.01)
*H04N 19/463* (2014.01)
*H04N 19/96* (2014.01)

(52) U.S. Cl.
CPC ......... *H04N 19/119* (2014.11); *H04N 19/463* (2014.11); *H04N 19/96* (2014.11)

(58) Field of Classification Search
None
See application file for complete search history.

(56) References Cited

U.S. PATENT DOCUMENTS

2017/0006309 A1* 1/2017 Liu ...................... H04N 19/597

OTHER PUBLICATIONS

Zhu et al., "Systems and Methods for Partitioning Video Blocks for Video Coding", U.S. Appl. No. 16/957,419, filed Jun. 24, 2020.

* cited by examiner

*Primary Examiner* — Christopher Braniff
(74) *Attorney, Agent, or Firm* — Keating & Bennett, LLP

(57) ABSTRACT

A video coding device may be configured to perform video coding according to one or more of the techniques described herein. In one example, a method of partitioning video data for video coding, comprises receiving a video block including sample values, and partitioning the sample values according to the following set of partitioning modes: quadtree, horizontal or vertical symmetric binary tree, horizontal or vertical asymmetric binary tree, and horizontal or vertical triple tree.

3 Claims, 11 Drawing Sheets

SYSTEMS AND METHODS FOR PARTITIONING VIDEO BLOCKS FOR VIDEO CODING

CROSS REFERENCE

This Nonprovisional application claims priority under 35 U.S.C. § 119 on provisional Application No. 62/612,180 on Dec. 29, 2017, the entire contents of which are hereby incorporated by reference.

TECHNICAL FIELD

This disclosure relates to video coding and more particularly to techniques for partitioning a picture of video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, I T, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of partitioning video data for video coding, comprises receiving a video block including sample values, and partitioning the sample values according to the following set of partitioning modes: quadtree, horizontal or vertical symmetric binary tree, horizontal or vertical asymmetric binary tree, and horizontal or vertical triple tree.

In one example, a method of reconstructing video data comprises receiving signaling corresponding to a partitioning for a coded video block, where sample values of the video block are partitioned according to the following set of partitioning modes: quadtree, horizontal or vertical symmetric binary tree, horizontal or vertical asymmetric binary tree, and horizontal or vertical triple tree, and reconstructing video data based on the partitioning for the coded video block.

DESCRIPTION OF EMBODIMENTS

Figure 1:
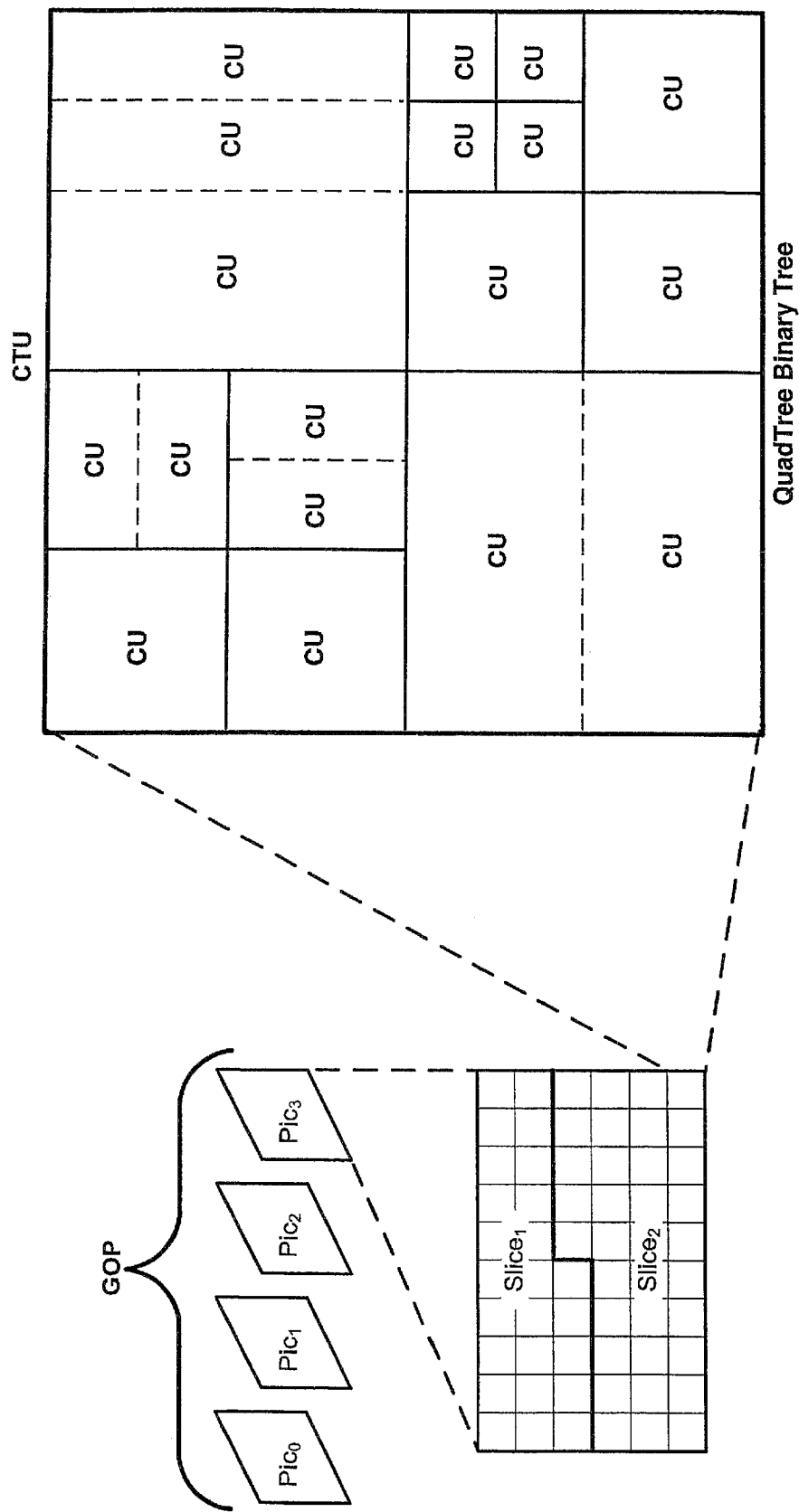
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for partitioning a picture of video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for partitioning video data for video coding comprises one or more processors configured to receive a video block including sample values, and partition the sample values according to the following set of partitioning modes: quadtree, horizontal or vertical symmetric binary tree, horizontal or vertical asymmetric binary tree, and horizontal or vertical triple tree.

In one example, a non-transitory computer-readable storage medium comprises instructions stored thereon that, when executed, cause one or more processors of a device receive a video block including sample values, and partition the sample values according to the following set of partitioning modes: quadtree, horizontal or vertical symmetric binary tree, horizontal or vertical asymmetric binary tree, and horizontal or vertical triple tree.

In one example, an apparatus comprises means for receiving a video block including sample values, and means for partitioning the sample values according to the following set of partitioning modes: quadtree, horizontal or vertical symmetric binary tree, horizontal or vertical asymmetric binary tree, and horizontal or vertical triple tree.

In one example, a device for reconstructing video data comprises one or more processors configured to receive signaling corresponding to a partitioning for a coded video block, where sample values of the video block are partitioned according to the following set of partitioning modes: quadtree, horizontal or vertical symmetric binary tree, horizontal or vertical asymmetric binary tree, and horizontal or vertical triple tree, and reconstruct video data based on the partitioning for the coded video block.

In one example, a non-transitory computer-readable storage medium comprises instructions stored thereon that, when executed, cause one or more processors of a device to receive signaling corresponding to a partitioning for a coded video block, where sample values of the video block are partitioned according to the following set of partitioning modes: quadtree, horizontal or vertical symmetric binary tree, horizontal or vertical asymmetric binary tree, and horizontal or vertical triple tree, and reconstruct video data based on the partitioning for the coded video block.

In one example, an apparatus comprises means for receiving signaling corresponding to a partitioning for a coded video block, where sample values of the video block are partitioned according to the following set of partitioning modes: quadtree, horizontal or vertical symmetric binary tree, horizontal or vertical asymmetric binary tree, and horizontal or vertical triple tree, and means for reconstructing video data based on the partitioning for the coded video block.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixels values may be described as including sample values for respective components of video data, which may also be referred to as color components, (e.g., luma (Y) and chroma (Cb and Cr) components or red, green, and blue components). It should be noted that in some cases, the terms pixel values and sample values are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes.

ITU-T H.264 specifies a macroblock including 16×16 luma samples. That is, in ITU-T H.264, a picture is segmented into macroblocks. ITU-T H.265 specifies an analogous Coding Tree Unit (CTU) structure. In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
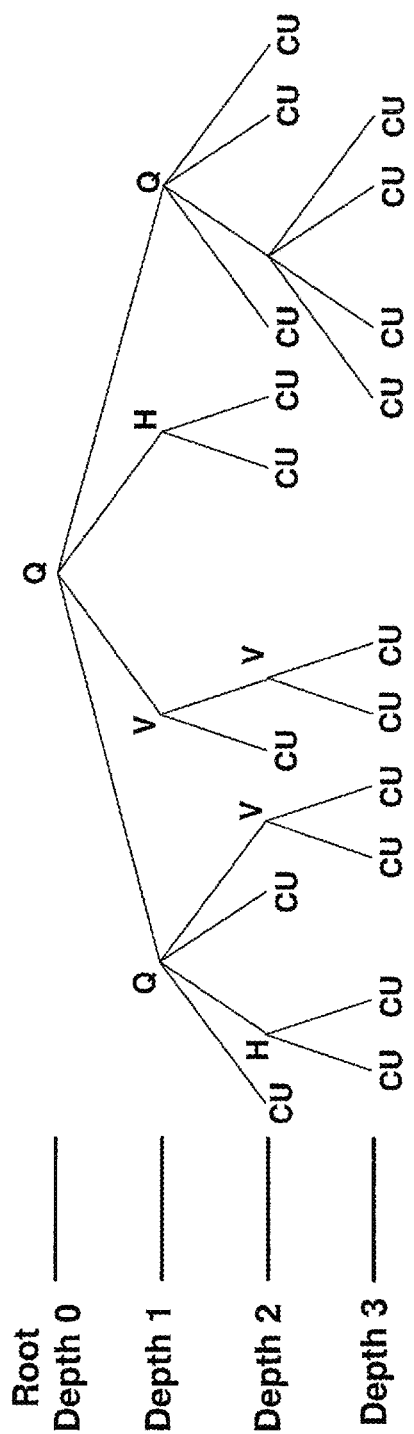
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1.

In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0 (i.e., BT split mode coding tree=0), no binary splitting is indicated. When a BT split mode syntax element has a value of 3 (i.e., BT split mode coding tree=11), a vertical split mode is indicated. When a BT split mode syntax element has a value of 2 (i.e., BT split mode coding tree=10), a horizontal split mode is indicated. Further, BT splitting may be performed until a maximum BT depth is reached. Thus, according to JEM, the QTBT illustrated in FIG. 2 may be signaled based on the pseudo-syntax provided in Table 1:

TABLE 1

Figure 3:
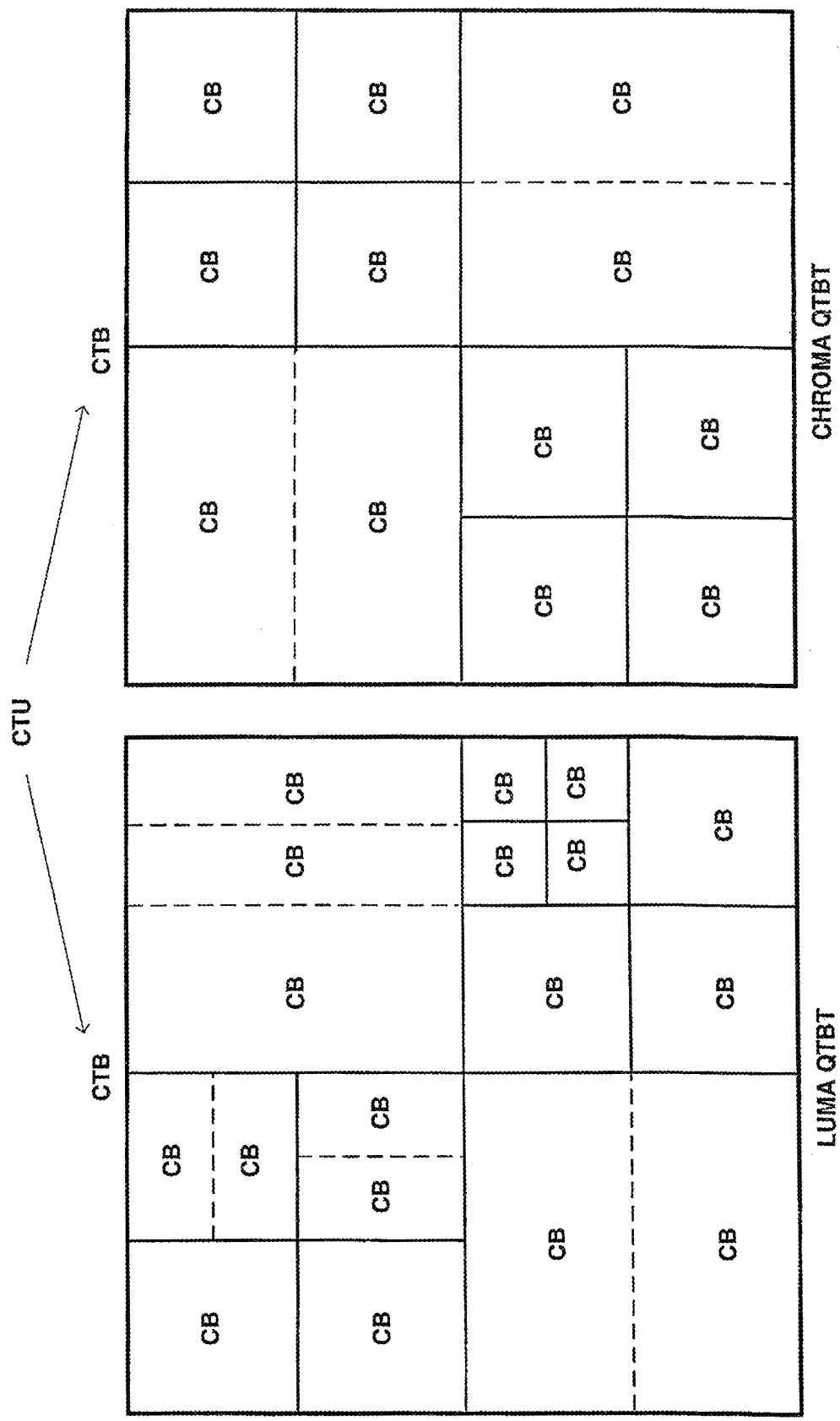
FIG. 3 is a conceptual diagram illustrating video component quad tree binary tree partitioning in accordance with one or more techniques of this disclosure.

QT flag = 1; //Depth 0 syntax
  QT flag = 1; //Depth 1 syntax
    QT flag = 0, BT split = 0; //Depth 2 syntax
    QT flag = 0, BT split = 10; //Depth 2 syntax
      BT split = 0; //Depth 3 syntax
      BT split = 0; //Depth 3 syntax
    QT flag = 0, BT split = 0; //Depth 2 syntax
    QT flag = 0, BT split = 11; //Depth 2 syntax
      BT split = 0; //Depth 3 syntax
      BT split = 0; //Depth 3 syntax
  QT flag = 0; BT split = 11; //Depth 1 syntax
    BT split = 0; //Depth 2 syntax
    BT split = 11; //Depth 2 syntax
      BT split = 0; //Depth 3 syntax
      BT split = 0; //Depth 3 syntax TABLE 1-continued QT flag = 0; BT split = 10; //Depth 1 syntax
    BT split = 0; //Depth 2 syntax
    BT split = 0; //Depth 2 syntax
  QT flag = 1; //Depth 1 syntax
    QT flag = 0, BT split = 0; //Depth 2 syntax
    QT flag = 1; //Depth 2 syntax
      QT flag = 0, BT split = 0; //Depth 3 syntax
      QT flag = 0, BT split = 0; //Depth 3 syntax
      QT flag = 0, BT split = 0; //Depth 3 syntax
      QT flag = 0, BT split = 0; //Depth 3 syntax
    QT flag = 0, BT split = 0; //Depth 2 syntax
    QT flag = 0, BT split = 0. //Depth 2 syntax As illustrated in FIG. 2 and Table 1, QT split flag syntax elements and BT split mode syntax elements are associated with a depth, where a depth of zero corresponds to a root of a QTBT and higher value depths correspond to subsequent depths beyond the root. Further, in JEM, luma and chroma components may have separate QTBT partitions. That is, in JEM luma and chroma components may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component are not required to and do not necessarily align with CBs of chroma components. Currently, in JEM independent QTBT structures are enabled for slices using intra prediction techniques. It should be noted that in some cases, values of chroma variables may need to be derived from the associated luma variable values. In these cases, the sample position in chroma and chroma format may be used to determine the corresponding sample position in luma to determine the associated luma variable value.

Additionally, it should be noted that JEM includes the following parameters for signaling of a QTBT tree:
  CTU size: the root node size of a quadtree (e.g., 256×256, 128×128, 64×64, 32×32, 16×16 luma samples);
  MinQTSize: the minimum allowed quadtree leaf node size (e.g., 16×16, 8×8 luma samples);
  MaxBTSize: the maximum allowed binary tree root node size, i.e., the maximum size of a leaf quadtree node that may be partitioned by binary splitting (e.g., 64×64 luma samples);
  MaxBTDepth: the maximum allowed binary tree depth, i.e., the lowest level at which binary splitting may occur, where the quadtree leaf node is the root (e.g., 3);
  MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 4:
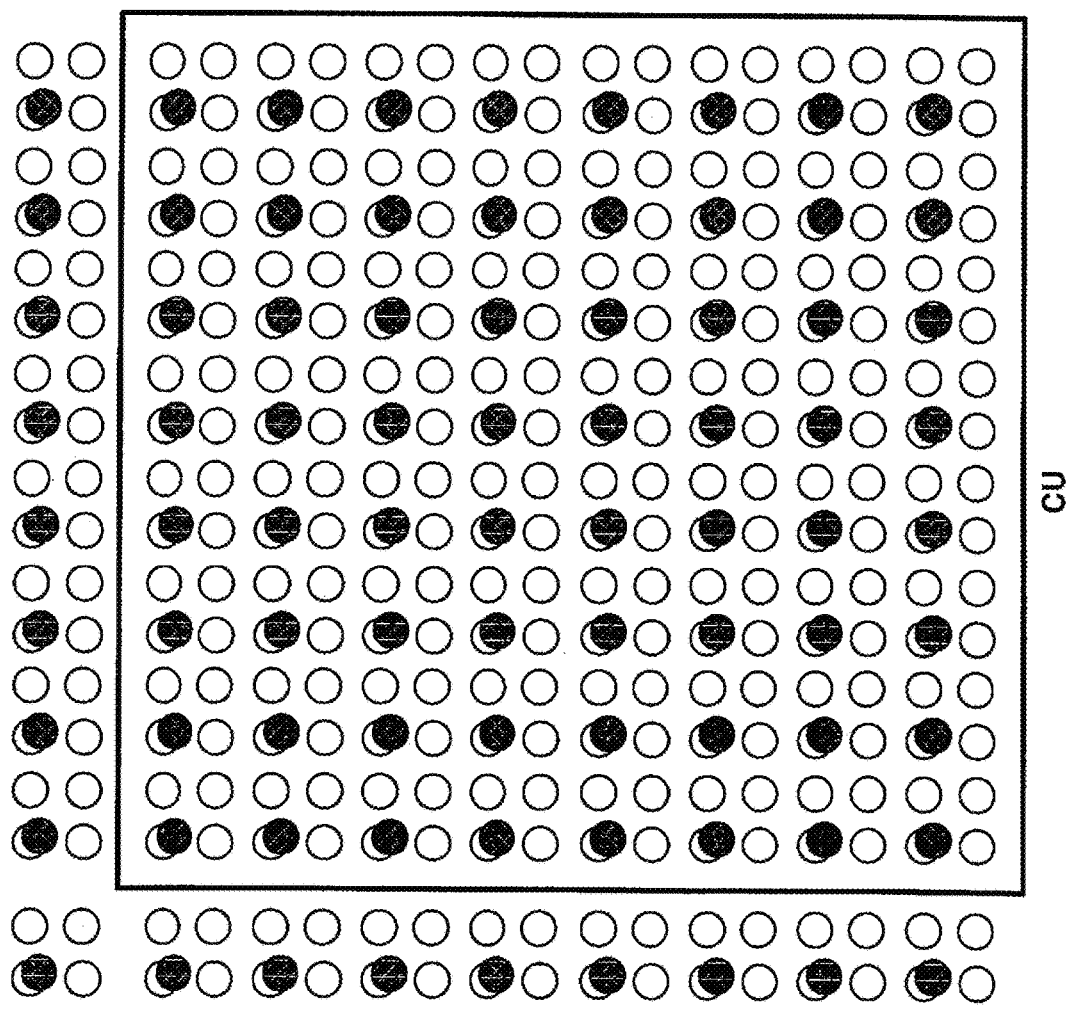
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
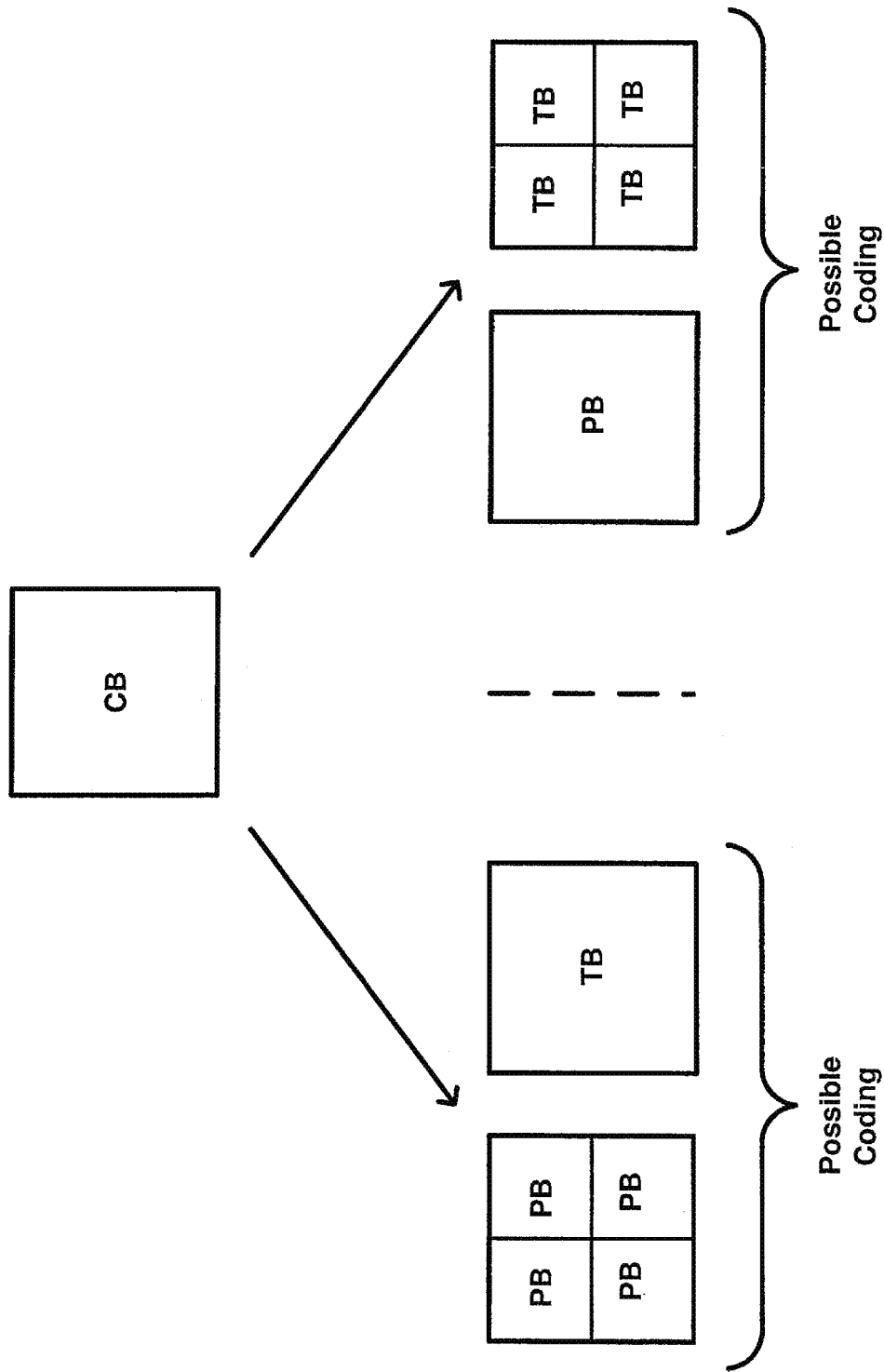
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 6A:
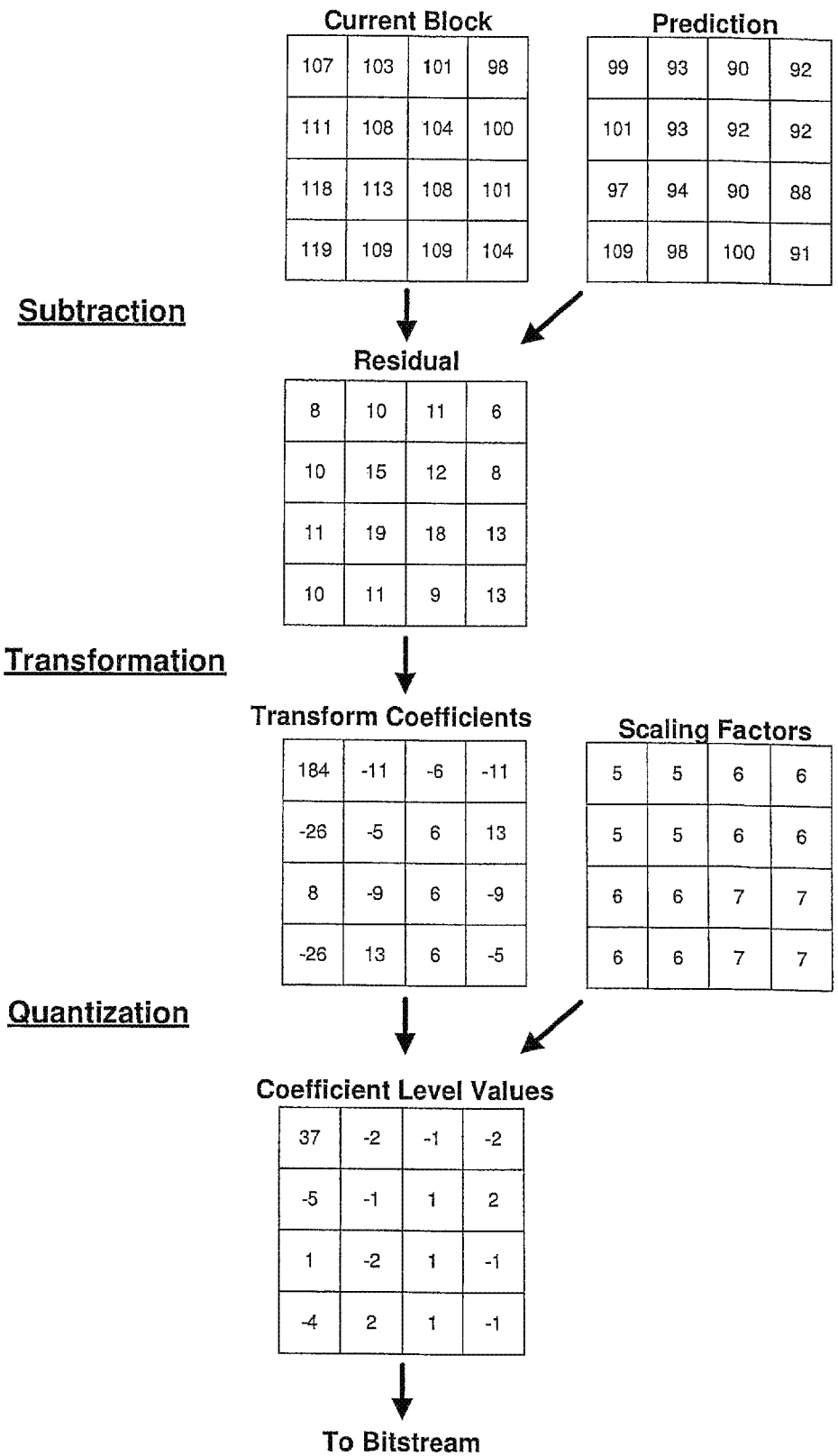
FIG. 6A is a conceptual diagram illustrating an example of coding a block of video data in accordance with one or more techniques of this disclosure.
Figure 6B:
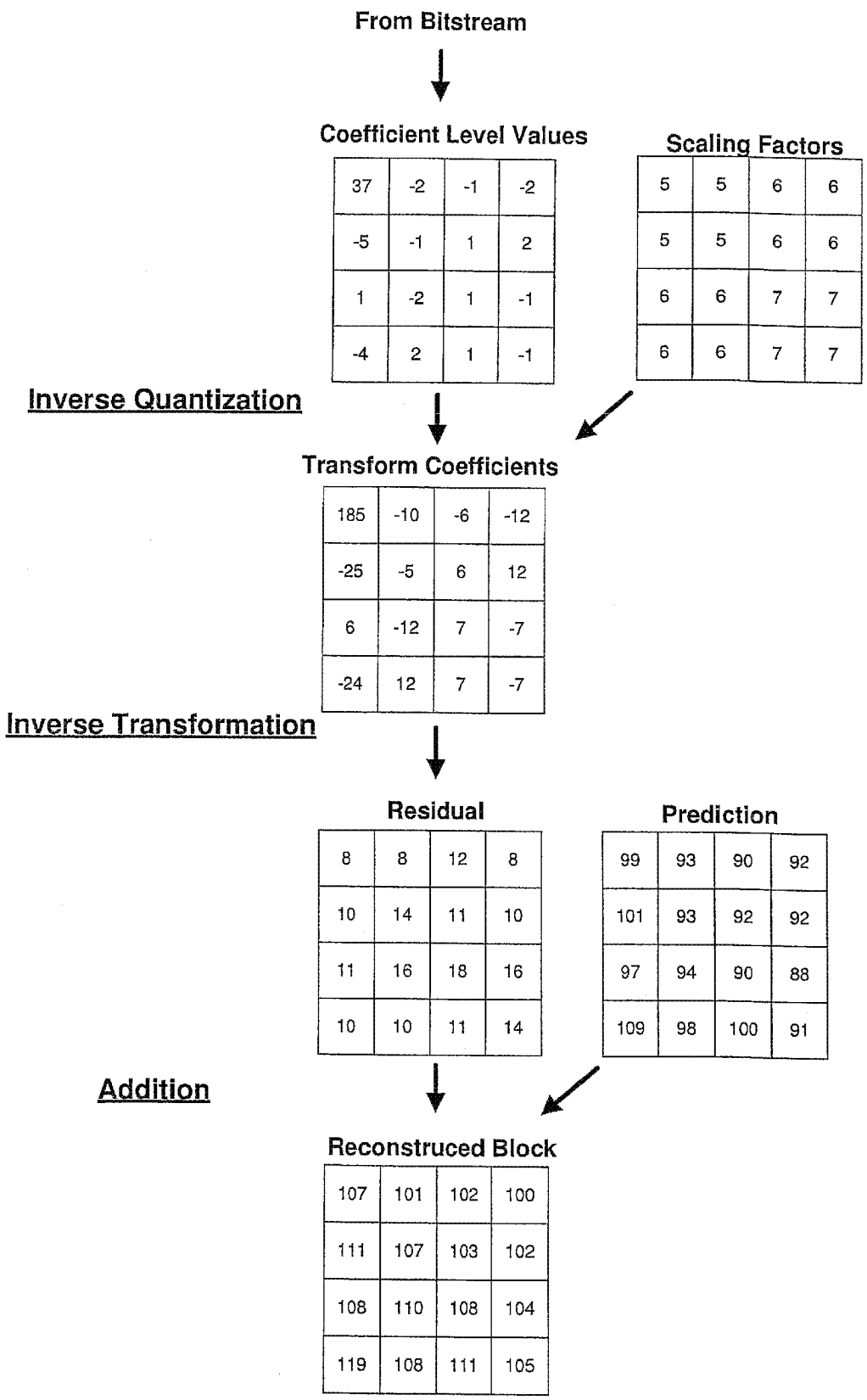
FIG. 6B is a conceptual diagram illustrating an example of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 6A-6B, scaling is performed using an array of scaling factors.

As illustrated in FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, in JEM, a QTBT leaf node, which allows for arbitrary rectangular CBs, may be analogous to both a PB and a TB in ITU-T H.265. Thus, is some cases, JEM may provide less flexibility with respect to possible PB and TB structures than as provided in ITU-T H.265. Further, in ITU-T H.265, only square TBs are allowed and only square PBs are allowed for intra prediction. Thus, some processes in ITU-T H.265 are defined based on the assumption that an array of sample values input to the process must be square and as such, some processes in ITU-T H.265 may not provide adequate support for coding arbitrary rectangular video blocks. Further, QTBT partitioning and associated signaling as defined in JEM may be less than ideal.

Figure 7:
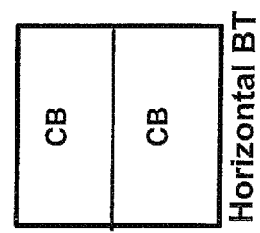
FIG. 7 is a conceptual diagram illustrating partitioning in accordance with one or more techniques of this disclosure.
Figure 7:
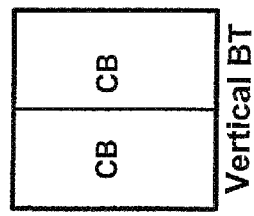
Figure 7:
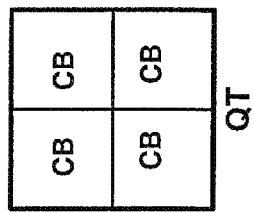
Figure 7:
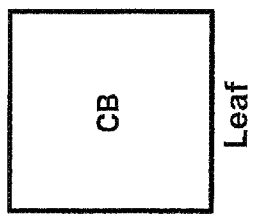
Figure 7:
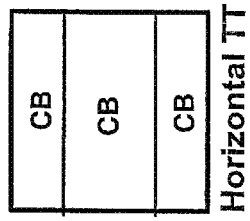
Figure 7:
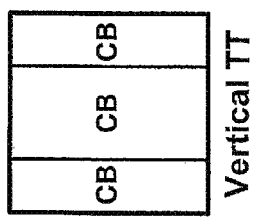
Figure 7:
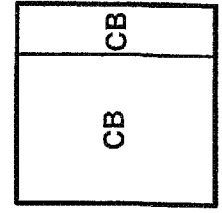
Figure 7:
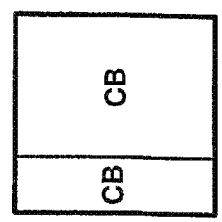
Figure 7:
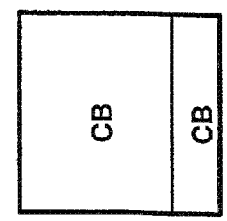
Figure 7:
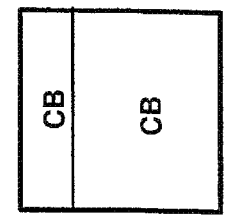

As described above, ITU-T H.265 supports four asymmetric PB partitions for inter prediction. Further, it should be noted that with respect to JEM, techniques have been proposed for partitioning CUs according to asymmetric binary tree partitioning. F. Le Leannec, et al., "Asymmetric Coding Units in QTBT," 4th Meeting: Chengdu, C N, 15-21 Oct. 2016, Doc. JVET-D0064 (hereinafter "Le Leannec"), describes where in addition to the symmetric vertical and horizontal BT split modes, four additional asymmetric BT split modes are defined. In Le Leannec, the four additionally defined BT split modes for a CU include: horizontal partitioning at one quarter of the height (at the top for one mode or at the bottom for one mode) or vertical partitioning at one quarter of the width (at the left for one mode or the right for one mode). The four additionally defined BT split modes in Le Leannec are illustrated in FIG. 7 as Hor_Up, Hor_Down, Ver_Left, and Ver_Right. Table 2 provides a summary of the bin coding tree signaling used in Le Leannec for signaling possible partitions. It should be noted that in some examples, binary split modes that do not partition a block into equal halves may be referred to as asymmetric binary tree (ABT) partitions.

TABLE 2

| | Bin Coding Tree | | | | |
|---|---|---|---|---|---|
| $Bin_0$ | $Bin_1$ | $Bin_2$ | $Bin_3$ | $Bin_4$ | Partition Type |
| 1 | N/A | N/A | N/A | N/A | Quad Tree Split |
| 0 | 0 | N/A | N/A | N/A | Leaf Node |
| 0 | 1 | 0 | 0 | N/A | Horizontal Symmetric Binary Tree |
| 0 | 1 | 0 | 1 | 0 | Horizontal 1/4 of block dimension top (Hor_Up) |
| 0 | 1 | 0 | 1 | 1 | Horizontal 1/4 of block dimension bottom (Hor_Down) |
| 0 | 1 | 1 | 0 | N/A | Vertical Symmetric Binary Tree |
| 0 | 1 | 1 | 1 | 0 | Vertical 1/4 of block dimension left (Ver_Left) |
| 0 | 1 | 1 | 1 | 1 | Vertical 1/4 of block dimension right (Ver_Right) |

Li, et al., "Multi-Type-Tree," 4th Meeting: Chengdu, C N, 15-21 Oct. 2016, Doc. JVET-D0117r1 (hereinafter "Li"), describes an example where in addition to the symmetric vertical and horizontal BT split modes, two additional triple tree (TT) split modes are defined. It should be noted that in some cases, partitioning a node into three blocks about a direction may be referring to as triple tree (TT) partitioning. In Li, the two additionally defined TT split modes for a node include: (1) horizontal TT partitioning at one quarter of the height from the top edge and the bottom edge of a node; and (2) vertical TT partitioning at one quarter of the width from the left edge and the right edge of a node. The two additionally defined TT split modes in Li are illustrated in FIG. 7 as Vertical TT and Horizontal TT. Table 3 provides a summary of the bin coding tree signaling used in Li for signaling possible partitions.

TABLE 3

| | Bin Coding Tree | | | |
|---|---|---|---|---|
| $Bin_0$ | $Bin_1$ | $Bin_2$ | $Bin_3$ | Partition Type |
| 1 | N/A | N/A | N/A | Quad Tree Split |
| 0 | 0 | N/A | N/A | Leaf Node |
| 0 | 1 | 0 | 0 | Horizontal Symmetric Binary Tree |
| 0 | 1 | 0 | 1 | Horizontal Triple Tree at 1/4 of block dimension. (Horizontal TT) |

TABLE 3-continued

Bin Coding Tree

| $Bin_0$ | $Bin_1$ | $Bin_2$ | $Bin_3$ | Partition Type |
|---|---|---|---|---|
| 0 | 1 | 1 | 0 | Vertical Symmetric Binary Tree |
| 0 | 1 | 1 | 1 | Vertical Triple Tree at 1/4 of block dimension (Vertical TT) |

The techniques described in Le Leannec and Li may be less than ideal. For example, the techniques described in Le Leannec and Li may not provide sufficient flexibility for partitioning images included detailed features.

Figure 8:
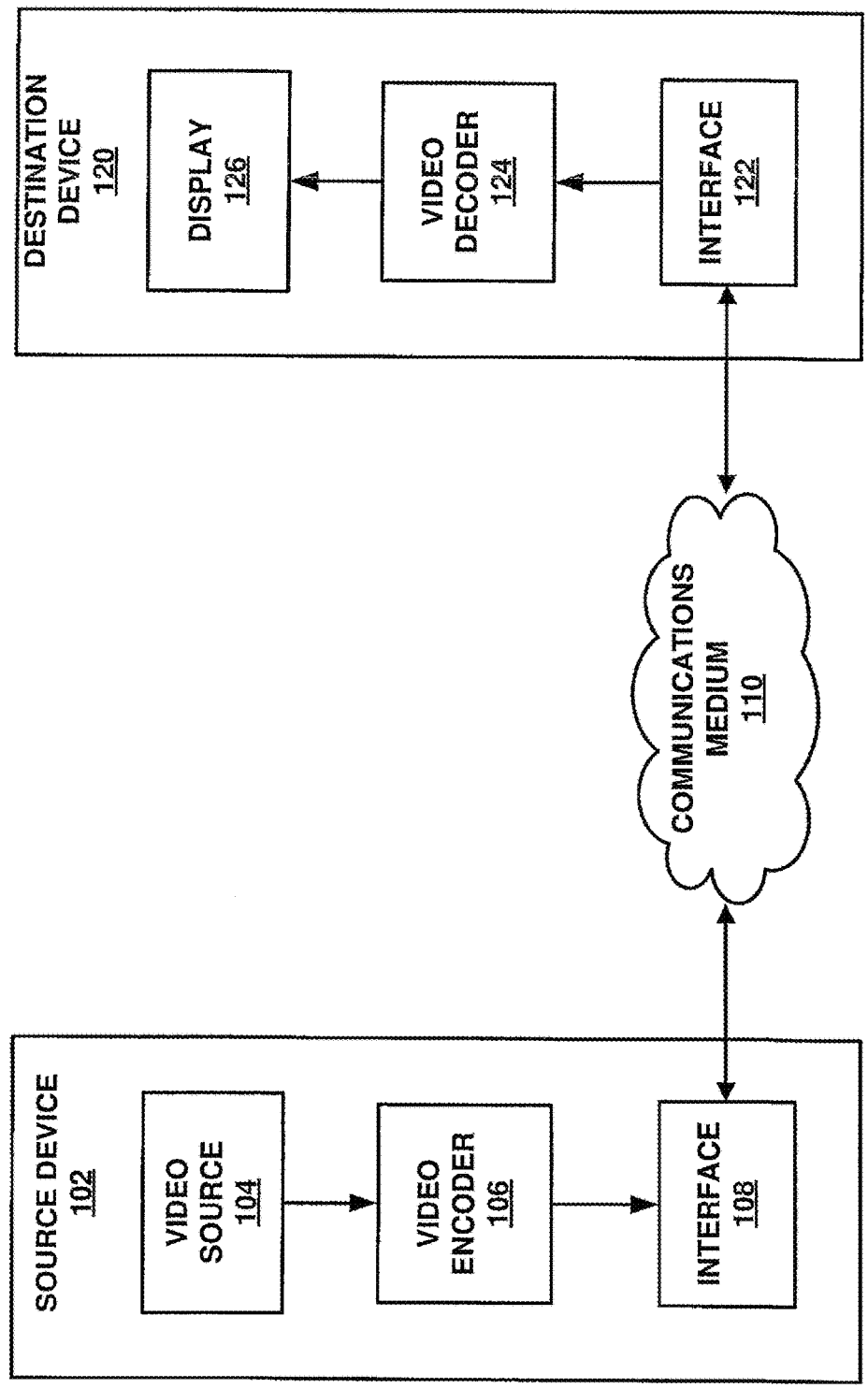
FIG. 8 is a block diagram illustrating an example of a system that may be configured to encode and decode video data according to one or more techniques of this disclosure.

FIG. 8 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 8, system 100 includes source device 102, communications medium 110, and destination device 120. In the example illustrated in FIG. 8, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 8, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 8, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 8, video decoder 124 is described as outputting data to display 126, video decoder 124 may be configured to output video data to various types of devices and/or sub-components thereof. For example, video decoder 124 may be configured to output video data to any communication medium, as described herein.

Figure 9:
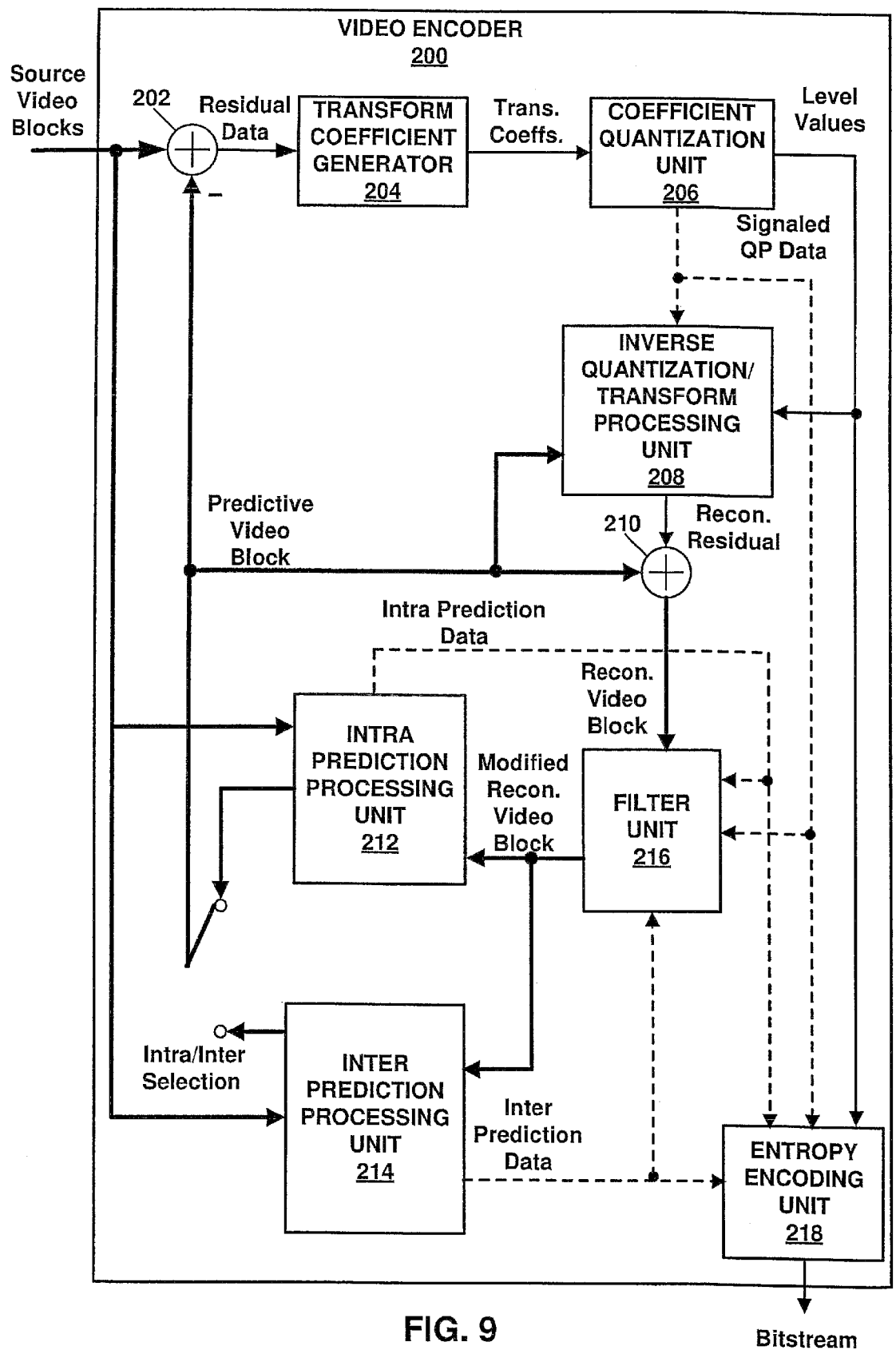
FIG. 9 is a block diagram illustrating an example of a video encoder that may be configured to encode video data according to one or more techniques of this disclosure.

FIG. 9 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 9, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 9, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 9, video encoder 200 receives source video blocks and outputs a bitstream. As described above, QTBT partitioning techniques in JEM and proposed modification thereto may be less than ideal. According to the techniques described herein, video encoder 200 may be configured to partition a video block using a combination of the QT partitioning, symmetric BT partitioning, ABT partitioning, and TT partitioning. Table 4 illustrates an example of bin coding signaling that may be used for signaling QT partitioning, symmetric BT partitioning, ABT partitioning, and TT partitioning according to the techniques described herein.

TABLE 4

| Bin Coding | | | | | | |
|---|---|---|---|---|---|---|
| $Bin_0$ | $Bin_1$ | $Bin_2$ | $Bin_3$ | $Bin_4$ | $Bin_5$ | Partition Type |
| 1 | N/A | N/A | N/A | N/A | N/A | Quad |
| 0 | 0 | N/A | N/A | N/A | N/A | Leaf Node |
| 0 | 1 | 0 | 0 | N/A | N/A | Horizontal Triple Tree at ¼ of block dimension. (Horizontal TT) |
| 0 | 1 | 1 | 0 | N/A | N/A | Vertical Triple Tree at ¼ of block dimension. (Vertical TT) |
| 0 | 1 | 0 | 1 | 0 | N/A | Horizontal BT |
| 0 | 1 | 0 | 1 | 1 | 0 | Horizontal ABT at ¼ from top (Hor_Up) |
| 0 | 1 | 0 | 1 | 1 | 1 | Horizontal ABT at ¼ from bottom (Hor_Down) |
| 0 | 1 | 1 | 1 | 0 | N/A | Vertical BT |

TABLE 4-continued

| Bin Coding | | | | | | |
|---|---|---|---|---|---|---|
| $Bin_0$ | $Bin_1$ | $Bin_2$ | $Bin_3$ | $Bin_4$ | $Bin_5$ | Partition Type |
| 0 | 1 | 1 | 1 | 1 | 0 | Vertical ABT at ¼ from left (Ver_Left) |
| 0 | 1 | 1 | 1 | 1 | 1 | Vertical ABT at ¼ from right (Ver_Right) |

It should be noted that in other examples, the types of partitions and bin strings illustrated in Table 4 may be interchanged. With respect to Table 4, in one example, subsequent QT partitioning may be allowed for a node formed according to another type of partition. For example, a node formed from a TT partition (e.g., the central node) may be allowed to be subsequently partitioned according to a QT partitioning. In one example, BT and/or TT partitioning may be allowed for a node formed according to another type of partition. In one example, subsequent QT, BT partitioning, and/or TT partitioning may not be allowed for a node formed according to another type of partition. In some cases, whether subsequent QT, BT, and/or TT partitioning is allowed may depend on particular nodes of a parent partition. For example, different partitioning types may be allowed for the center and outer nodes resulting from a TT partitioning.

With respect to Table 4, parameters QTDepth, BTDepth, ABTDepth, TTDepth, and TotalDepth may be defined as follows:
  QTDepth: the current QT depth is equal to the number of times QT partition has been performed starting from the root of the partitioning tree for the CTU to the current CU. The current QT depth will increase by one whenever a QT partition is performed,
  BTDepth: the current BT depth is equal to the number of times symmetric BT partitioning has been performed starting from the root of the partitioning tree for the CTU to the current CU. The current BT depth wilt increase by one whenever a BT partition is performed;
  ABTDepth: the current ABT depth is equal to the number of times ABT partition has been performed starting from the root of the partitioning tree for the CTU to the current CU. The current ABT depth will increase by one whenever a ABT partition is performed;
  TTDepth: the current TT depth is equal to the number of times TT partition has been performed starting from the root of the partitioning tree for the CTU to the current CU. The current QT depth will increase by one whenever a QT partition is performed;
  TotalDepth: the current Total depth is equal to the sum of QTDepth, BTDepth, ABTDepth, and TTDepth.

In one example, subsequent QT partitioning may not be allowed according to one or more of the following examples. In one example, a M×N block is not allowed to be split by QT when M/2 or N/2 is odd. In some cases, M may be equal to N. In one example, a M×N block is not allowed to be split by QT when M or N is equal to or smaller than minQTSize. In one example, a M×N block is not allowed to be split by QT when the current QT depth is larger than or equal to a QT depth threshold value. In one example, a M×N block is not allowed to be split by QT when the current QT depth is smaller than or equal to a QT depth threshold value. It should be noted that in some examples, QT depth threshold values may vary from slice-to-slice.

In one example, whether subsequent QT, BT, and/or TT partitioning is allowed may depend on one or more of the following: block size, picture/slice type (e.g., intra or inter), number of samples, and/or pre-determined number minimum number of samples for allowed partitions; the minimum CU size allowed for the frame; the depths of neighboring CUs; the BT, TT and ABT depths of the current CU; the sizes of CUs in the previous pictures; the value of a high-level flag (e.g., a flag in a slice header, or parameter set); a temporal ID of the current picture; image statistics (e.g., energy of transform coefficients, sum of squares of coefficient levels, etc.) of neighboring CUs, and/or co-located CUs in previously coded pictures. It should be noted that image statistics may provide an indication of prediction quality and in some examples, it may be useful to enable more partitioning options in regions where prediction quality is indicated as poor.

As described above, in some examples, whether subsequent QT, BT, and/or TT partitioning is allowed may depend on particular nodes of a parent partition. In some examples, whether a subsequent partition is allowed for a particular node may be based on whether a resulting partition is redundant. For example, for a central node resulting from a TT vertical partition, subsequent QT and/or BT vertical partitions may not be allowed due to the nodes resulting from the subsequent QT partitioning being redundant to a combination of symmetric BT partitions and the nodes resulting the subsequent BT vertical partitioning being redundant to two vertical symmetric BT partitions. Similarly, for a central node resulting from a TT horizontal partition, subsequent QT and BT horizontal partitions may not be allowed.

It should be noted that in cases where QT, BT, and/or TT partitioning are not allowed for a node, the example bin coding signaling illustrated in Table 4 used for signaling QT partitioning, symmetric BT partitioning, ABT partitioning, and TT partitioning may be modified. That is, the signaling may be simplified to exclude partitions that are not allowed. Table 5 illustrates an example of bin coding signaling used for a node where QT partitioning is not allowed. Table 6 illustrates an example of bin coding signaling used for a node where BT partitioning is not allowed. Table 7 illustrates an example of bin coding signaling used for a node where QT and BT partitionings are not allowed.

TABLE 5

| | Bin Coding | | | | |
|---|---|---|---|---|---|
| $Bin_0$ | $Bin_1$ | $Bin_2$ | $Bin_3$ | $Bin_4$ | Partition Type |
| 0 | N/A | N/A | N/A | N/A | Leaf Node |
| 1 | 0 | 0 | N/A | N/A | Horizontal Triple Tree at 1/4 of block dimension. (Horizontal TT) |
| 1 | 1 | 0 | N/A | N/A | Vertical Triple Tree at 1/4 of block dimension. (Vertical TT) |
| 1 | 0 | 1 | 0 | N/A | Horizontal BT |
| 1 | 0 | 1 | 1 | 0 | Horizontal ABT at 1/4 from top (Hor_Up) |
| 1 | 0 | 1 | 1 | 1 | Horizontal ABT at 1/4 from bottom (Hor_Down) |
| 1 | 1 | 1 | 0 | N/A | Vertical BT |
| 1 | 1 | 1 | 1 | 0 | Vertical ABT at 1/4 from left (Ver_Left) |
| 1 | 1 | 1 | 1 | 1 | Vertical ABT at 1/4 from right (Ver_Right) |

TABLE 6

| | Bin Coding | | | | |
|---|---|---|---|---|---|
| $Bin_0$ | $Bin_1$ | $Bin_2$ | $Bin_3$ | $Bin_4$ | Partition Type |
| 1 | N/A | N/A | N/A | N/A | Quad |
| 0 | 0 | N/A | N/A | N/A | Leaf Node |
| 0 | 1 | 0 | 0 | N/A | Horizontal Triple Tree at 1/4 of block dimension. (Horizontal TT) |
| 0 | 1 | 1 | 0 | N/A | Vertical Triple Tree at 1/4 of block dimension. (Vertical TT) |
| 0 | 1 | 0 | 1 | 0 | Horizontal ABT at 1/4 from top (Hor_Up) |
| 0 | 1 | 0 | 1 | 1 | Horizontal ABT at 1/4 from bottom (Hor_Down) |
| 0 | 1 | 1 | 1 | 0 | Vertical ABT at 1/4 from left (Ver_Left) |
| 0 | 1 | 1 | 1 | 1 | Vertical ABT at 1/4 from right (Ver_Right) |

TABLE 7

| | Bin Coding | | | |
|---|---|---|---|---|
| $Bin_0$ | $Bin_1$ | $Bin_2$ | $Bin_3$ | Partition Type |
| 0 | N/A | N/A | N/A | Leaf Node |
| 1 | 0 | 0 | N/A | Horizontal Triple Tree at 1/4 of block dimension. (Horizontal TT) |
| 1 | 1 | 0 | N/A | Vertical Triple Tree at 1/4 of block dimension. (Vertical TT) |
| 1 | 0 | 1 | 0 | Horizontal ABT at 1/4 from top (Hor_Up) |
| 1 | 0 | 1 | 1 | Horizontal ABT at 1/4 from bottom (Hor_Down) |
| 1 | 1 | 1 | 0 | Vertical ABT at 1/4 from left (Ver_Left) |
| 1 | 1 | 1 | 1 | Vertical ABT at 1/4 from right (Ver_Right) |

It should be noted that in some examples, for example, with respect to Table 4 and Table 5, there may be various cases where a QT split flag is signaled or not signaled. For example, in one example, a QT split flag may be signaled after one or several BT, TT or ABT flags are signaled. In one example, a QT split flag may be signaled dependent on the current QT depth. In one example, a QT split flag may be signaled dependent on the current CU size. In one example, a QT split flag may be signaled dependent on the QT depths of neighboring CUs. In one example, a QT split flag may be signaled dependent on the minimal allowed QT width and height, which may be indicated in a parameter set or slice header. In one example, a QT split flag may be signaled dependent on image statistics of neighboring and/or co-located CUs in previously coded frames.

It should be noted that in some cases, splits may round to the nearest N samples. For example, a video coding implementation may require that the height and/or width of a video block be a multiple of four. Thus, in some cases, symmetric BT splits and ABT splits may result in the same partitioning. For example, in the case where the height of a video block is required to be a multiple of four and the height to be split is 24, both an BT and an ABT result in two sub-blocks having a height of 12. In one example, if the resulting split offset of a symmetric BT split is equal to that of the offset of a ABT split, video encoder 200, may only use the symmetric BT split mode and the bin coding may be simplified. For example, referring to Table 4, in one example, since the BT split and one of the ABT splits are equivalent, the following simplification may occur: semantically redefine $Bin_4$ such that a value 0 indicates a symmetric BT split and a value of 1 indicates the non-equivalent ABT split. It should be noted that in this case, in one example, the associated CABAC context of $Bin_4$ may be unchanged. In one example, the following simplification may occur, $Bin_4$ coding is skipped altogether.

As described above, the example bin coding signaling illustrated in Table 4 used for signaling QT partitioning, symmetric BT partitioning, ABT partitioning, and TT partitioning may be modified. For example, as described above in some cases, the coding of $Bin_4$ may be skipped. Thus, in some cases, a video coding process need not check the value of bin(s) corresponding to a partitioning mode that is skipped. Thus, in one example, a video coding device may implement a process to determining whether or not it is necessary and/or how to check the value of bins corresponding to partitioning modes. In one example, a video coding device may be configured to determine whether and/or how to check partitioning modes based on the following process:

Define an array bNeedCheckSplitMode[NUM_SPLIT_MODES]={checkNoSplit, checkQTSplit, checkBTVerSpl it, checkBTHorSplit, checkTTVerSplit, checkTTHorSplit checkVer_Left, checkHor_Up, checkVer_Right, checkHor_Down}. The initial values of the variables at each position in the array indicates if the corresponding split mode is valid (1) or not (0).

Where the values in the bNeedCheckSplitMode may depend on several conditions. For example, the values may depend on the conditions described above. The values in the array bNeedCheckSplitMode may be 0 or 1.

$$SumCheckFlags = \sum_{i=0}^{NUM\_SPLIT\_MODES-1} bNeedCheckSplitMode\,[i]$$

For decoding the current split mode, s,
Iteration k from 0 to NUM_SPLIT_MODES−1.
Check whether SumCheckFlags is equal to 1
If so, s should be the split mode with bNeedCheckSplitMode[s] equal to 1 and break the iteration.
Otherwise,
If bNeedCheckSplitMode[k] is equal to 1 then, decode one bin.
If the bin indicates split mode is equal to k then, s is set to k and break the iteration.
Otherwise, SumCheckFlags minus 1 set bNeedCheckSplitMode[k] to 0 and continue the iteration
The value of s indicates the split mode.

In one example, truncated unary binarization (or its complement) may be used for signaling split modes. In one example, if only one split mode is valid, then no explicit signaling is needed in the bitstream and a video decoder infers the corresponding split mode. In one example, a flag is included in the bitstream for each valid split mode, except the last valid split mode. When a split mode is indicated as selected by a flag, then the flags corresponding to the remaining split modes do not have to be signaled. A video decoder uses the flag(s) to determine the selected split mode. If all flag(s) indicate that the corresponding split mode is not selected, then the last split mode is inferred by a video decoder.

In one example, video encoder 200 may be configured to test and select the most efficient partitioning among the partition modes illustrated in Table 4. It should be noted that the most efficient partitioning denotes a partitioning with the current minimal rate-distortion cost for a current CU. In one example, video encoder 200 may be configured to test the partition modes in the following order:
NO_SPLIT partitioning with different nodes
QT split partitioning
BT_HORZ split partitioning
BT_VERT split partitioning
TT_HORZ split partitioning
TT_VERT split partitioning
ABT_HORZ split partitioning
ABT_VERT split partitioning In one example, when a test for a partitioning mode is finished, video encoder 200 may check whether the most efficient partitioning includes a NO_SPLIT partition and whether the partitioning includes a QT/BB/TT/ABT/Total depth that is larger than a threshold and if this condition occurs, video encoder 200 may skip testing the other partitioning modes.

Referring again to FIG. 9, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 9, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 9, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 9). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 9, inter prediction processing unit 214 may receive reconstructed video block via filter unit 216. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 9, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

As described above, in the example of a CABAC, for a particular bin, a context model may be selected from a set of available context models associated with the bin and in some examples, a context model may be selected based on a previous bin and/or values of previous syntax elements. In one example, when coding QT split for a channel, context index, CtxIdx for selecting a context model may be derived as follows:

$$CtxtIdx = 0$$

If Left block's QT depth is greater than current QT depth, CtxIdx++

If Top block's QT depth is greater than current QT depth, CtxIdx++

Use CtxtIdx to code QT split

In one example, when coding QT split for a channel, context index, CtxIdx for selecting a context model may be derived as follows:

$$CtxtIdx = 0$$

If Left block's Total depth is greater than current Total depth, CtxtIdx++

If Top block's Total depth is greater than current Total depth, CtxtIdx++

Use CtxtIdx to code QT split

As describe above, if the offset of a symmetric BT split is equal to that of the offset of a ABT split, video encoder 200, in some examples, may skip coding $Bin_4$ in Table 4. In the case where, $Bin_4$ and $Bin_5$ use different contexts (e.g., ctxt0 for $Bin_4$ and ctxt1 for $Bin_5$), when coding of $Bin_4$ is skipped, the context for $Bin_5$, uiCtxIdx, may be calculated as follows:

$$uiCtxIdx = uiWidth == uiHeight \ ? \ 0 \ : \ (uiWidth > uiHeight?1:2)$$

where,
 == is an "Equal to" relational operator;
 > is a "Greater than" relational operator;
 x?y:z If x is TRUE or not equal to 0, evaluates to the value of y; otherwise, evaluates to the value of z; and
 uiWidth and uiHeight are the width and height of the video block corresponding to $Bin_5$ In this manner, video encoder 200 represents an example of a device configured to receive a video block including sample values and partition the sample values according to the following set of partitioning modes: quadtree, horizontal or vertical symmetric binary tree, horizontal or vertical asymmetric binary tree, and horizontal or vertical triple tree.

Figure 10:
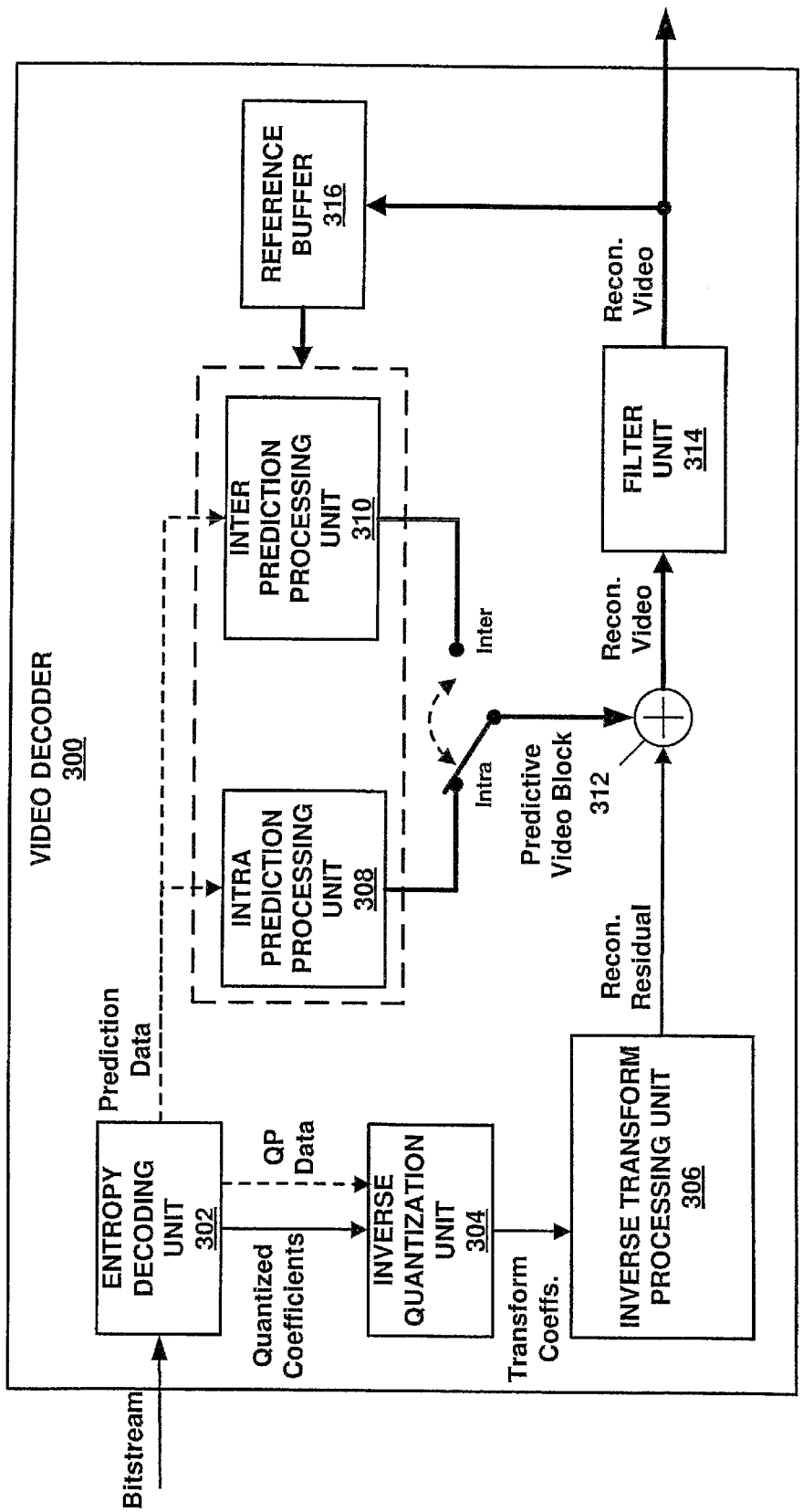
FIG. 10 is a block diagram illustrating an example of a video decoder that may be configured to decode video data according to one or more techniques of this disclosure.

FIG. 10 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 10 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 10, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine partitioning structures generated and/or signaled based on one or more of the techniques described above for purposes of reconstructing video data. For example, video decoder 300 may be configured to parse syntax elements and/or evaluate properties of video data in order to determine a partitioning.

Referring again to FIG. 10, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values (e.g., determine a sum of QT depth and BT depth based on coding parameters), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 10, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the filter unit 314 may be configured to determine QP values and use them for post filtering (e.g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 10, a reconstructed video block may be output by video decoder 300. In this manner, video decoder 300 may be configured to generate reconstructed video data according to one or more of the techniques described herein. In this manner video decoder 300 represents an example of a device configured to receive signaling corresponding to a partitioning for a coded video block, where sample values of the video block are partitioned according to the following set of partitioning modes: quadtree, horizontal or vertical symmetric binary tree, horizontal or vertical asymmetric binary tree, and horizontal or vertical triple tree, and reconstruct video data based on the partitioning for the coded video block.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of partitioning video data for video coding, the method comprising:
   determining whether each of partitioning modes for a video block is allowed depending on a block size, an allowed minimum size, and a depth of a current coding unit,
   wherein the partitioning modes includes a quadtree partitioning, a horizontal symmetric binary tree partitioning, a vertical symmetric binary tree partitioning, a horizontal triple tree partitioning, and a vertical triple tree partitioning;
   determining whether a subsequent partitioning for a subsequent block is allowed based on a parent partition,
   wherein, in a case that the subsequent block is a central node resulting from the vertical triple tree partitioning, a subsequent quadtree partitioning and a subsequent vertical symmetric binary tree partitioning are disallowed;
   signaling bin values corresponding to allowed partitioning modes, wherein signaling the bin values includes determining a context index for a bin value indicating the quadtree partitioning based on at least whether a quadtree depth of a left neighboring video block is greater than a quadtree depth of the video block and whether a quadtree depth of an above neighboring video block is greater than the quadtree depth of the video blocks.

2. A method of reconstructing video data, the method comprising:
   determining whether each of partitioning modes for a video block is allowed depending on a block size, an allowed minimum size, and a depth of a current coding unit,
   wherein the partitioning modes includes a quadtree partitioning, a horizontal symmetric binary tree partitioning, a vertical symmetric binary tree partitioning, a horizontal triple tree partitioning, and a vertical triple tree partitioning;

determining whether a subsequent partitioning for a subsequent block is allowed based on a parent partition, wherein, in a case that the subsequent block is a central node resulting from the vertical triple tree partitioning, a subsequent quadtree partitioning and a subsequent vertical symmetric binary tree partitioning are disallowed;

decoding bin values corresponding to allowed partitioning modes, wherein decoding the bin values includes determining a context index for a bin value indicating the quadtree partitioning based on at least whether a quadtree depth of a left neighboring video block is greater than a quadtree depth of the video block and whether a quadtree depth of an above neighboring video block is greater than the quadtree depth of the video block; and reconstructing video data based on the allowed partitioning modes.

3. A device for reconstructing video data, the device comprising one or more processors configured to:

determine whether each of partitioning modes for a video block is allowed depending on a block size, an allowed minimum size, and a depth of a current coding unit, wherein the partitioning modes includes a quadtree partitioning, a horizontal symmetric binary tree partitioning, a vertical symmetric binary tree partitioning, a horizontal triple tree partitioning, and a vertical triple tree partitioning;

determine whether a subsequent partitioning for a subsequent block is allowed based on a parent partition, wherein, in a case that the subsequent block is a central node resulting from the vertical triple tree partitioning, a subsequent quadtree partitioning and a subsequent vertical symmetric binary tree partitioning are disallowed;

decode bin values corresponding to allowed partitioning modes, wherein decoding the bin values includes determining a context index for a bin value indicating the quadtree partitioning based on at least whether a quadtree depth of a left neighboring video block is greater than a quadtree depth of the video block and whether a quadtree depth of an above neighboring video block is greater than the quadtree depth of the video block; and reconstruct video data based on the allowed partitioning modes.

* * * * *